Aug. 6, 1957 J. F. PAULUCCI 2,801,930
FROZEN FOOD PRODUCT
Filed March 16, 1953
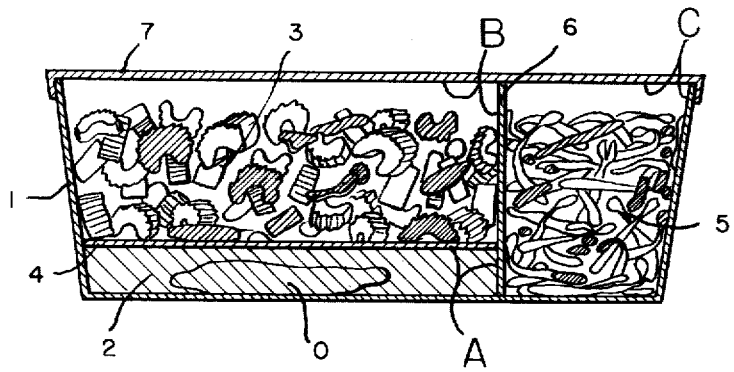
FIG. I
INVENTOR.
JENO F. PAULUCCI
BY
Richard P. Cardew
AGENT United States Patent Office 2,801,930
Patented Aug. 6, 1957

2,801,930

FROZEN FOOD PRODUCT

Jeno Francis Paulucci, Duluth, Minn.

Application March 16, 1953, Serial No. 342,506

1 Claim. (Cl. 99—193)

This invention relates to food products and has special reference to main dishes of meals which are packaged and frozen for marketing.

It is well known that there are now on the market many kinds of frozen foods, including individual vegetables, individual meats, fish, and the like, as well as combination dishes such as beef pot pie, chicken pot pie, and even a Chinese food, chow mein. The instant invention is related to the combination dishes above mentioned, and especially to the latter Chinese dish.

The frozen food combination dishes now on the market are of poor quality and usually do not appear or taste as good as similar canned foods, and canned foods do not compare very favorably with similar home cooked foods. For example, canned Chinese foods do not have the clear and colorful appearance nor the distinct tastes present in home-made Chinese foods, or that which might be prepared in a restaurant. The reason for this is due to the fact that canned foods must be subjected to high temperatures in a retort for sterilization purposes and this cooks the ingredients, of course, overcooking most of the fragile vegetables causing them to shrink and to lose their color and crispness. The cooking also causes the contents of the can to acquire a substantially uniform taste and dark color. While the individual indentity of the ingredients is lost to a very great degree in the canned products, in the home made products, the vegetables are cooked only to the required degree and they will retain their individual flavor, color, and crispness.

In frozen chow mein, or the like, the same loss of individual flavor, color, and crispness occurs as in canned chow mein, but due to other causes. The frozen product is certainly no better than the canned up until the present time.

In the preparation of the frozen chow mein now on the market the ingredients are cooked together, the solids such as meat, and vegetables are all cooked in the same liquid or sauce and they are poured in a container together for freezing. Obviously, the product acquires a substantially uniform taste in the same manner as canned products, and even though the product may not have been cooked long enough to cause the vegetables to become mushy, the freezing of the product causes same to become mushy. It is deemed apparent that the freezing liquid expands and that this expansion tends to crush the relatively delicate vegetables, which themselves have a high moisture content, for the vegetables provide the only place expansion can take place within the frozen block of food. The resultant product is, as stated, no better than canned and is just as mushy.

Another disadvantage of frozen foods, such as chow mein, is that they require quite a great deal of time to thaw and prepare for eating. Some producers recommend first thawing at room temperature and others recommend placing the frozen block of food in a pan over a low heat for thawing. This latter process requires 12 to 15 minutes and requires constant stirring to prevent burning or searing the food on the under or heated side of the block.

In the processing of Chinese foods, wherein celery is used in large quantities, whether the product is frozen or canned, the celery is tough and lacks the crunchiness characteristic of celery. The other vegetables used, such as bamboo shoots, water chestnuts, pimentos, and especially the more delicate ones such as bean sprouts, also lose much of their original flavor and identity.

There has been a long search to find a satisfactory canned or frozen food product such as chow mein wherein the taste, color, and crunchiness of the home-made product is provided so that any housewife can serve a dish comparable to that served in the best restaurants specializing in Chinese foods.

It is the principal object of this invention to provide this product long searched for.

More specifically, it is one of the objects of this invention to provide a packaged frozen food product including the ingredients for a main dish of a meal including vegetables and a sauce therefor.

Another object is to provide such a packaged food product wherein the maximum of the color, crunchiness and flavor of the ingredients, vegetables particularly, are retained, throughout the processing, freezing, thawing and ultimate eating of the product so that the product will closely resemble (have) the color, taste, appearance and texture of the same product made from fresh ingredients at home or in a restaurant.

Another object is to provide such a packaged product which may be thawed and heated in the least possible time and with the least amount of preparation and attention by the housewife so that a good tasting and appearing meal may be prepared very quickly.

Another object is to provide such a packaged food product wherein the color and taste of the ingredients do not run together as readily or as rapidly as in conventional packaging.

Another more specific object is to provide a frozen food package containing a sauce in a separate compartment from the other ingredients, the said sauce containing substantially all of the seasoning for all of the ingredients in the package whereby the said sauce may be thawed and warmed first and thawing will be quite rapid because of the seasoning and consistency of the sauce, thereby making the overall thawing time less than normal thawing time for frozen foods.

Another object is to provide specially prepared vegetables in a separate compartment from the seasoned sauce, the vegetables and sauce being so prepared, arranged and packaged that the vegetables will not be crushed by the freezing process.

In the accompanying drawing forming a part of this application:

Fig. 1 is a vertical sectional view of a frozen Chinese food package in accordance with my invention.

In the drawing the reference numeral 1 indicates a container which may be of any desired material, shape or size of course, however, a low or flat container, as shown, is preferred, as is an aluminum foil for the material for the container. The numeral 2 indicates a sauce which may comprise only a suitable liquid, or a broth, or a meat stock including meat, either poultry, beef, pork or mixtures thereof, and a broth made with water but preferably with chicken fat therein for the latter adds flavor to the broth, of course, however, water may be used without chicken fat, or any suitable sauce preparation may be used which will garnish the vegetables in a desired manner.

One form of sauce is prepared by blanching onions, suitably cooking the meats until done and then combining same in a container with chicken broth or other suitable liquid and sufficient seasoning added thereto to season the contents of the entire package including the vegetables. Preferably, a little corn starch or the like is added to the sauce to thicken same. The cooked sauce is allowed to cool and as it cools it becomes thicker, of course, however, it is preferred that the stock have sufficient fluidity to permit its being flowed into the package or container 1 after it has been cooled.

The sauce 2 is placed in the container 1, preferably on the bottom thereof, in a thin layer. The sauce may be put into the container 1 immediately after preparation if desired, or after it is cooled, of course, however, the sauce should be cool before the remaining ingredients are added to the package.

The onions and meats if used are preferably pre-cooked separately before they are added to the sauce, for there is not the usual exchange of flavors which would occur if they were cooked together.

The sauce preferably comprises about one third of the weight of the carton in a Chinese food product such as chow mein, here illustrated, and is spread out as thin and evenly as possible on the bottom of the container 1, however, the proportion of sauce to vegetables may be varied, of course, without departing from the spirit of the invention.

The vegetables in the Chinese food product chow mein here shown are fresh and preferably include celery, bean sprouts, mushrooms, water chestnuts, bamboo shoots, and pimento or combinations thereof. Some of these vegetables are very delicate, especially bean sprouts, and all of them are subject to becoming shrunken, discolored, tough, tasteless and mushy if they are not prepared and packaged properly, especially if they are later frozen.

In accordance with my invention, the fresh vegetables are cut up, preferably into long thin pieces and are suitably blanched in a conventional manner, and some of the vegetables preferably being blanched separately, for example, the bean sprouts. The blanched vegetables are then drained for a period of one to several hours so that substantially all of the excess free water is drained off of them. It is preferred that the vegetables be drained for from eight to twelve hours.

The drainage of the free water from the vegetables is important to reduce expansion of the water and crushing of the vegetables when freezing takes place.

The blanched vegetables may be combined before draining or after, of course, or, if preferred, some of the more delicate vegetables may be kept separate from the bulk of the vegetables. The drained vegetables 3 are placed in the container 1 with a separation wall 4 between the sauce 2 and the vegetables 3, the wall 4 separating the container into a lower compartment A for the sauce and an upper compartment B for the vegetables, as shown. The vegetables are mixed and loosely packed so as to have air spaces interspersed throughout their mass as shown to permit air circulation and to prevent compacting or crushing of the mass when freezing. If desired, the more delicate vegetables, such as bean sprouts 5, may be packed in a compartment C separated from either the sauce or the other vegetables by simply adding a vertical separation wall 6 to divide the container B into three separate compartments.

From the above it is deemed apparent that a predetermined quantity of specially prepared and cool sauce 2 is placed in the container 1, separation walls 4 and 6 are placed in the container, and specially prepared vegetables 3 and 5 are placed in the other compartments.

A suitable cover 7 is then put on the container and a suitable wrapper not shown such as those used to wrap frozen foods is wrapped around the closed package, making the package ready for freezing in the usual manner.

The sauce freezes in its lower compartment into a solid thin block. When the vegetables freeze, however, they do not form a solid block, as the free water has been drained therefrom and they are cut so that they can be loosely intermixed to provide air spaces interspersed throughout their mass, the longer pieces serving to provide support for the mass, of course. There preferably is not sufficient liquid in the vegetable mass when packed to cause any of the vegetables to lie submerged in liquid as they are freezing, but rather, there should be no water at all, or at least the absolute minimum of free water present in the vegetable mass at the time of freezing to prevent the crushing of the vegetables during the freezing. The mass of vegetables becomes frosted or frozen together, of course, however, the mass may be readily broken apart when frozen because of the air spaces and lack of free water.

The package, when frozen, is ready for market and may be stored and handled in the same manner as other frozen food products.

In preparing the meal from the frozen package, the housewife opens the package and removes the entire contents as a unit. The solid block of sauce is separated from the vegetables in any convenient manner, such as by inserting a knife between the two units at the separation wall to pry them apart. This is not a difficult or time consuming operation.

The frozen sauce 2 is placed in a pan, such as a sauce pan over a low heat and is stirred as it thaws. The sauce thaws quite readily due to the thinness of the unit and the seasoning contained therein which lowers the freezing and thawing point of the sauce. The vegetables 3 may be added to the sauce as soon as it is thawed and starting to become warm. The vegetable mass may be added to the sauce in one piece or it may be broken into smaller units before being added to the sauce, as desired. The bean sprouts 5 are most delicate and are added last if they are packaged separately as shown.

The vegetables and sauce are heated to the desired temperature and are ready for serving in about 5 or 6 minutes, which is a very short time in which to prepare a meal which looks, tastes, and feels like a home-cooked meal and does not have the slightest suggestion about it that it is a "package meal" in the common interpretation and understanding of the word.

The above description is given for clearness of understanding and it is deemed apparent that modifications of this invention may be apparent to those skilled in the art which are within the scope of the appended claim.

Having thus described my invention, what I claim is:

A method of preparing a frozen Chinese food package which comprises subjecting Chinese food vegetables while in a substantially unseasoned state to the application of heat of a nature and for a time and at a temperture sufficient to blanch such vegetables but insufficient to materially affect their individual crispness and taste, draining the vegetables until substantially all of the excess free water is drained off them, preparing a separate cooked sauce for the Chinese food vegetables, seasoning the sauce to an extent to provide substantially all the seasoning for the sauce and the vegetables when the two are admixed, pacing such vegetables and sauce in a single container separate and free from admixture with each other, and freezing the thus packaged product for sale as a single unit.

References Cited in the file of this patent

UNITED STATES PATENTS

| | | |
|---|---|---|
| 1,514,379 | Fleisher | Nov. 4, 1924 |
| 2,495,435 | Welch | Jan. 24, 1950 |
| 2,501,400 | Marshall | Mar. 21, 1950 |

FOREIGN PATENTS

| | | |
|---|---|---|
| 607,042 | Great Britain | Mar. 22, 1926 |
| 635,503 | Great Britain | Apr. 12, 1950 |

OTHER REFERENCES

"Refrigerating Engineering," February 1949, page 148.
"Quick Frozen Foods," January 1951, page 60.
"Food Engineering," November 1951, page 156.
"Quick Frozen Foods," February 1953, page 77.

UNITED STATES PATENT OFFICE

CERTIFICATE OF CORRECTION

Patent No. 2,801,930 August 6, 1957

Jeno Francis Paulucci

It is hereby certified that error appears in the above numbered patent requiring correction and that the said Letters Patent should read as corrected below.

Column 4, line 56, for "pacing" read --placing--.

Signed and sealed this 1st day of October 1957.

(SEAL)
Attest:
KARL H. AXLINE
Attesting Officer

ROBERT C. WATSON
Commissioner of Patents